(12) United States Patent
Linden et al.

(10) Patent No.: US 9,487,140 B2
(45) Date of Patent: Nov. 8, 2016

(54) CLOSURE LOCK STATUS DISPLAY SYSTEM AND RELATED METHOD

(71) Applicant: FORD GLOBAL TECHNOLOGIES LLC, Dearborn, MI (US)

(72) Inventors: Howard Paul Linden, Southfield, MI (US); Rafic Jergess, Warren, MI (US); Christopher Matthew Radjewski, Macomb Township, MI (US); Laura Viviana Hazebrouck, Birmingham, MI (US); John Thomas Ricks, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,234

(22) Filed: Jan. 29, 2015

(65) Prior Publication Data

US 2016/0221501 A1    Aug. 4, 2016

(51) Int. Cl.
```
B60Q 1/00      (2006.01)
B60Q 11/00     (2006.01)
B60R 25/34     (2013.01)
E05B 41/00     (2006.01)
B60Q 1/32      (2006.01)
```

(52) U.S. Cl.
CPC ............ B60Q 11/00 (2013.01); B60Q 1/323 (2013.01); B60R 25/34 (2013.01); E05B 41/00 (2013.01)

(58) Field of Classification Search
CPC ....... B60Q 1/323; B60R 25/34; E05B 41/00; G07C 9/00944
USPC .............................. 340/457, 438, 539.1, 468
See application file for complete search history.

(56) References Cited

U.S. PATENT DOCUMENTS

| | | | |
|---|---|---|---|
| 7,375,299 B1 | 5/2008 | Pudney | |
| 7,819,442 B2 | 10/2010 | Ieda | |
| 7,866,195 B2 * | 1/2011 | Levine | E05B 41/00 340/542 |
| 7,898,382 B2 * | 3/2011 | Berstis | G07C 9/00944 340/5.61 |
| 8,120,477 B2 * | 2/2012 | Hedrich | E05B 77/54 340/426.15 |
| 8,333,492 B2 | 12/2012 | Dingman | |
| 8,362,898 B2 * | 1/2013 | Berstis | G07C 9/00944 340/539.11 |
| 8,791,804 B2 * | 7/2014 | Campbell | B60R 25/2009 340/438 |
| 8,963,701 B2 * | 2/2015 | Rodriguez Barros | B60Q 1/2665 340/438 |
| 2004/0059483 A1 | 3/2004 | Sukakura | |
| 2009/0243791 A1 * | 10/2009 | Partin | G08C 17/00 340/5.2 |
| 2011/0285503 A1 | 11/2011 | Schuessler | |

(Continued)

FOREIGN PATENT DOCUMENTS

DE    4104119 A1    8/1992
JP    2004211539 A  7/2004

OTHER PUBLICATIONS

English translation for JP2004211539A.

(Continued)

*Primary Examiner* — John A Tweel, Jr.
(74) *Attorney, Agent, or Firm* — Jason Rogers; King & Schickli, PLLC

(57) ABSTRACT

A doorlock status display system is provided for a motor vehicle. That system includes a door module and a lock status display module. The door module includes a controller, a doorlock and a doorlock status sensor for each door of the motor vehicle. The lock status display module includes a lock status controller, a first indicator for door unlocked status, a second indicator for all doors locked status and a third indicator for all doors locked and closed status.

18 Claims, 3 Drawing Sheets

(56) References Cited

U.S. PATENT DOCUMENTS

| | | | |
|---|---|---|---|
| 2013/0106573 A1* | 5/2013 | Root | G08B 5/36 340/6.1 |
| 2013/0135088 A1* | 5/2013 | Simha | B60R 25/34 340/425.5 |
| 2013/0135094 A1* | 5/2013 | Berstis | G07C 9/00944 340/539.11 |
| 2014/0000165 A1 | 1/2014 | Patel | |
| 2014/0035600 A1 | 2/2014 | Sage | |
| 2014/0230329 A1 | 8/2014 | Patel | |
| 2014/0285319 A1 | 9/2014 | Khan | |
| 2014/0292004 A1 | 10/2014 | Ruse | |

OTHER PUBLICATIONS

English translation for DE4104119.

* cited by examiner

CLOSURE LOCK STATUS DISPLAY SYSTEM AND RELATED METHOD

TECHNICAL FIELD

This document relates generally to the vehicle equipment field and, more particularly, to a closure lock status display system and method for displaying the lock status of a motor vehicle.

BACKGROUND

In the past, a vehicle operator could quickly check the status of the door locks of a motor vehicle by manipulating the door handle to try and open the door. Today, however, many vehicles incorporate a capacitive unlock feature in the door handles so that grabbing any handle unlocks all the doors. This makes it difficult to determine the lock status of the vehicle doors from outside the vehicle. This document relates to a new and improved lock status display system that provides a visual indication of that status to the vehicle operator which may be quickly and easily viewed and understood.

SUMMARY

In accordance with the purposes and benefits described herein, a closure lock status display system is provided for a motor vehicle. That system may be broadly described as comprising a door module including a controller, a door lock and a door status sensor for a door of a motor vehicle and a lock status display module including a lock status controller, a first indicator for door unlocked status, a second indicator for all doors locked status and a third indicator for all doors locked and closed status. In one possible embodiment, the door status sensor includes a door lock sensor and a door position sensor.

In one possible embodiment, the first indicator includes a first light source, the second indicator includes a second light source and the third indicator includes a third light source. In one possible embodiment, the first indicator illuminates in a first color, the second indicator illuminates in a second color and the third indicator illuminates in a third color. In one possible embodiment, the first color is green, the second color is orange and the third color is red. In one possible embodiment, the first, second and third icons are all displayed by one unit and appear at the same location.

In one possible embodiment, the first indicator includes a first illuminated icon, the second indicator includes a second illuminated icon and the third indicator includes a third illuminated icon. In one possible embodiment, the first, second and third icons are illuminated in different colors. In one possible embodiment, the first icon is illuminated in green, the second icon is illuminated in orange and the third icon is illuminated in red. In one possible embodiment, the first icon depicts an unlocked padlock while the second and third icons depict a locked padlock.

In one possible embodiment, the lock status display module is located on a door of the vehicle. In one possible embodiment, the lock status display module is located on a body panel of the vehicle. In one possible embodiment, the lock status display module is located on an applique of the vehicle. In one possible embodiment, the lock status display module is located on a door handle of the vehicle.

Still further, the system may include additional door modules for each door of the motor vehicle wherein each such additional door module includes a controller, a door-lock and a door status sensor. Still further, where the motor vehicle includes liftgate, trunk lid or hatch, the system may further include a liftgate/trunk lid/hatch module for the liftgate/trunk lid/hatch of the motor vehicle. The liftgate/trunk lid/hatch module includes a controller, a liftgate/trunk lid/hatch lock and a liftgate/trunk lid/hatch status sensor. In one possible embodiment, the liftgate/trunk lid/hatch status sensor includes a liftgate/trunk lid/hatch lock sensor and a liftgate/trunk lid/hatch position sensor.

In accordance with an additional aspect, a method is provided for displaying the lock status of a motor vehicle. That method may be broadly described as comprising the steps of: (a) determining, by a sensor, closure status of each closure of the motor vehicle, (b) providing, by computing device, a first indication when at least one of the closures is unlocked, (c) providing, by computing device, a second indication when all of the closures are locked but at least one of the closures is not properly closed and (d) providing, by computing device, a third indication when all of the closures are locked and closed.

In the following description, there are shown and described several preferred embodiments of the doorlock status display system. As it should be realized, the system is capable of other, different embodiments and its several details are capable of modification in various, obvious aspects all without departing from the system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the doorlock status display system and together with the description serve to explain certain principles thereof. In the drawing figures.

Reference will now be made in detail to the present preferred embodiments of the doorlock status display system, examples of which are illustrated in the accompanying drawing figures.

DETAILED DESCRIPTION

Figure 1:
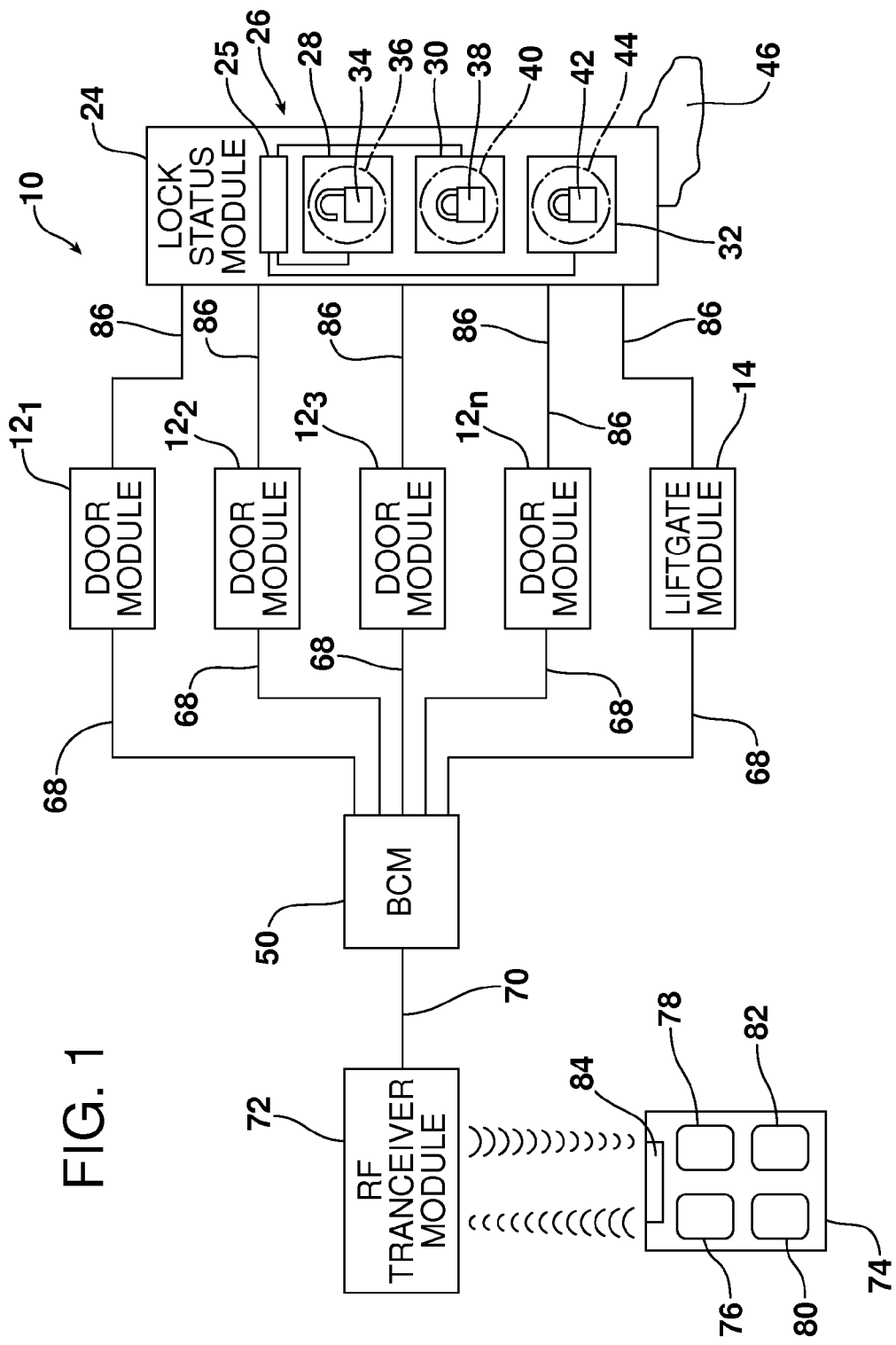
FIG. 1 is a schematic block diagram illustrating the doorlock status display system.

Reference is now made to FIG. 1 which is a schematic block diagram of the closure status display system 10 that is the subject of this document. As illustrated, the closure status display system 10 includes a door module 12$_1$-12$_n$ for each door of the motor vehicle to which the doorlock status display system is matched. Where the motor vehicle further includes a liftgate, the system 10 also may include a liftgate module 14. On vehicles incorporating a trunk lid or hatch instead of a liftgate, the extra module 14 would be a trunk lid/hatch module.

Figure 2:
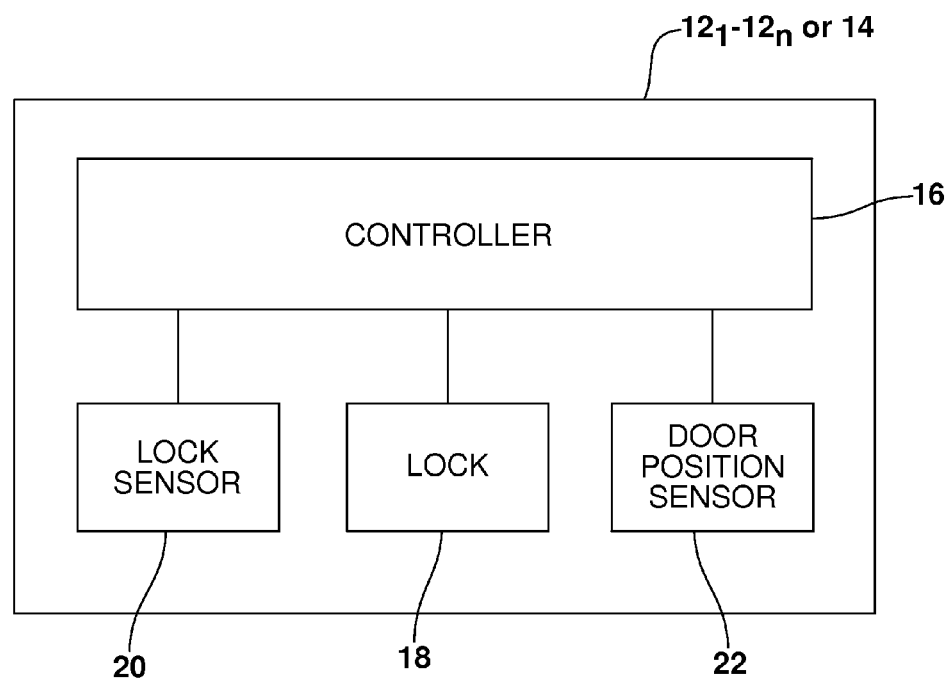
FIG. 2 is a schematic block diagram of any of the door modules or the liftgate module illustrated in FIG. 1.

As illustrated in FIG. 2, each door module 12$_1$-12$_n$ and each liftgate/trunk lid/hatch module 14 may include a controller 16 in the form of a dedicated microprocessor or electronic control unit (ECU), an electronic closure lock 18, a lock sensor 20 and a closure position sensor 22. As should be appreciated, the lock sensor 20 monitors the status of the associated lock 18 and provides a signal to the controller 16 indicating whether the lock 18 is unlocked or locked. In contrast, the closure position sensor 22 monitors the position of the associated closure and provides a signal to the controller 16 indicating whether the closure is opened or properly and fully closed.

Referring back to FIG. 1, the closure lock status display system 10 also includes a lock status display module 24. The lock status display module 24 includes a lock status controller 25 (in the form of a dedicated microprocessor or ECU) and a lock status display, generally designated by reference numeral 26. The lock status display 26 includes a first indicator 28, a second indicator 30 and a third indicator 32. As will be described in greater detail below, the first indicator 28 responds to the controller 25 and provides a visual indication when one or more of the doors or the liftgate/trunk lid/hatch is unlocked. In contrast, the second indicator 30 responds to the controller 25 and provides a visual indication when all of the doors and the liftgate/trunk lid/hatch are locked but at least one is opened/not properly closed. In still further contrast, the third indicator 32 responds to the controller 25 and provides a visual indication when all of the doors and the liftgate/trunk lid/hatch are all properly locked and closed. In the illustrated embodiment, the first indicator 28 comprises a first icon 34, in the form of an unlocked padlock, that is illuminated by a first light source 36. The second indicator 30 comprises a second icon 38, in the form of a locked padlock, that is illuminated by a second light source 40. The third indicator 32 comprises a third icon 42, in the form of a locked padlock, that is illuminated by a third light source 44. Substantially any type of light source may be utilized for the first, second and third light sources 36, 40, 44. In one possible embodiment, light emitting diodes are utilized because of their efficiency and reliability.

In one possible embodiment, the first indicator 28 is illuminated in a first color, the second indicator 30 is illuminated in a second, and the third indicator 32 is illuminated in a third color. The first color may be green and illumination of the first indicator 28 in green is indicative of the fact that at least one of the closures being monitored is unlocked. The second color may be orange and illumination of the second indicator 30 in orange is indicative of the fact that while all of the closures are locked, at least one is not properly closed. Still further, the third color may be red and the illumination of the third indicator 32 in the red is indicative of the fact that all of the closures are locked and properly closed.

As should be appreciated from reviewing FIG. 1, the lock status display module 24, including the lock status display 26, may be mounted to a vehicle component 46 where it is readily visible to the vehicle operator. Thus, the component 46 illustrated in the drawing figure may represent any closure or door of the vehicle, any body panel of the vehicle, an appliqué of the vehicle, a door handle of the vehicle or other vehicle structures where it might be desired to locate the display 26.

In accordance with an additional aspect, the doorlock status display system 10 provides an effective method for displaying the lock status of a motor vehicle. That method includes the step of determining, by sensor 20, 22 the closure status of each closure (e.g. door, trunk lid, hatch, liftgate, even hood and/or gas filler door if desired) of the motor vehicle. Further, the method includes the step of providing, by computing device/controller 16, a first indication when at least one of the closures is unlocked. In addition the method includes the step of providing, by computing device/controller 16, a second indication when all of the closures are locked but at least one of the closures is not properly closed. Still further the method includes the step of providing, by computing device/controller 16, a third indication when all of the closures are locked and properly closed.

Figure 3:
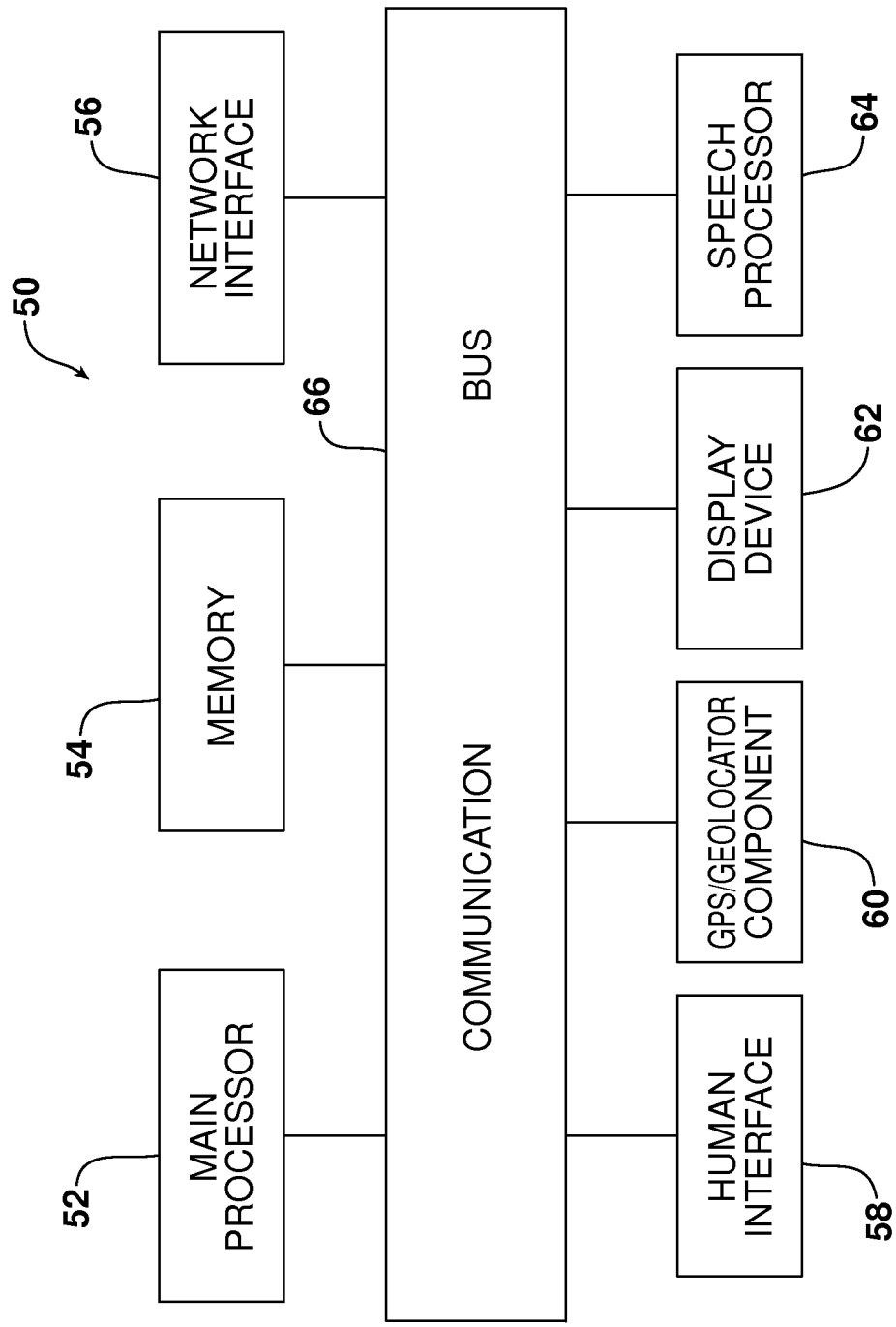
FIG. 3 is a schematic block diagram of the body control module (BCM) illustrated in FIG. 1.

Reference is now again made to FIG. 1 illustrating how the doorlock status display system 10 is integrated into a motor vehicle incorporating a body control module (BCM) 50. As illustrated in FIG. 3, the BCM 50 may comprise a computing device having one or more processors 52, one or more memories 54, one or more network interfaces 56, a human interface 58, a GPS/geo locator component 60, a display device such as a multi-function display with touch-screen capability 62 and a speech processor 64 that all communicate with each other over a communication bus 66. The BCM 50 performs a number of interior body electrically based functions including, for example, interior locking, remote key entry, interior light, exterior light, windshield wiper control and the like. In some embodiments, the BCM 50 may also function to control entertainment functions (e.g. radio, CD player and communications such as telephone and Internet communications over a wireless network). In some embodiments, the BCM 50 is connected by communication bus (not shown) to other control modules that provide one or more of these additional functions.

As illustrated in FIG. 1, the door modules 12$_1$-12$_n$ and the optional liftgate/trunk lid/hatch module 14 are all connected via control lines 68 to the BCM 50. In addition the BCM 50 may be connected via control line 70 to an RF transceiver module 72 that allows wireless communication with an electronic key fob 74 that is carried by the vehicle operator. The electronic key fob 74 includes actuators that perform various functions including a doorlock actuator 76, a door unlock actuator 78, a liftgate/trunk lid/hatch unlock actuator 80 and a panic/emergency signal actuator 82. Further, the key fob 74 includes a transceiver 84 matched to the RF transceiver module 72 thereby allowing for the wireless transmission and receipt of signals therebetween.

When the operator depresses the doorlock actuator 76, a security code (unique to the motor vehicle) and a door lock signal are transmitted by the transceiver 84 to the RF transceiver module 72. The security code and door lock request received by the transceiver module 72 are then sent through the signal line 70 to the BCM 50. After confirming the proper security code, the BCM sends a signal along line 68 to the door modules 12$_1$-12$_n$ and the liftgate/trunk lid/hatch module 14 directing the controllers 16 in those modules to lock the electronic lock 18 for each door and liftgate/trunk lid/hatch. Next, the lock sensor 20 associated with each of those closures confirms that each electronic lock 18 is in the locked state and each closure position sensor monitors the position of each closure. Data indicative of the lock state of each electronic lock 18 and the closure position of each closure is sent by the respective lock sensors 20 and position sensors 22 back to their associated controllers 16 which then send that information through the control lines 86 to the controller 25 of the lock status display module 24. If the controllers 16 indicate that all of the closures are properly closed and the associated electronic locks 18 are all properly locked, the controller 25 illuminates the third indicator 32 thereby providing a visual indication that all closures are properly closed and locked and the vehicle is secure. The vehicle operator may quickly confirm the status of the vehicle by simply viewing the lock status display 26 which is provided at a readily visible location on the motor vehicle.

In contrast, even if all of the electronic locks 18 are in the locked state, if one or more of the closures is determined to be open or improperly closed by the closure position sensors 22, the controller(s) 16 associated with such closure(s) will indicate such a condition by signal(s) sent to the controller 25 of the lock status display module 24. As a result, the controller 25 illuminates the second indicator 30. This provides a visual indication that while all of the closures are in the locked state, one or more is not properly closed. Thus, the vehicle operator is alerted to this condition. If desired, an audio signal or voice processor message to this effect could also be provided.

If the operator wishes to unlock the driver's door using the key fob 74, the operator depresses the door unlock actuator 78 once. The security code and a door unlock signal are then sent by the key fob transceiver 84 to the RF transceiver module 72 of the motor vehicle. The security code and instruction are then sent through the line 70 to the BCM 50. The BCM 50 again confirms the proper security code before sending the unlock signal through the signal line 68 to door module $12_1$ associated with the driver's door. Upon receiving this signal, the controller 16 of the door module $12_1$ sends a signal to the electronic lock 18 causing the lock to be unlocked. Upon receiving confirmation of the unlock status of the lock 18 from the lock sensor 20, the controller 16 sends a signal along line 86 to the controller 25 of the lock status display module 24 and the first indicator 28 is illuminated thereby providing a visual indication of the unlock status of at least one door of the motor vehicle.

In the event the operator wishes to unlock all of the doors of the motor vehicle, the door unlock actuator 78 is depressed twice in succession within a predetermined period of time thereby sending the appropriate security code and an all doors unlocked signal from the key fob transceiver 84 to the RF transceiver module 72 of the motor vehicle. Here again, the security code and unlock instruction is sent by the module 72 through the line 70 to the BCM 50. BCM 50 confirms the proper security code before sending a control signal through the lines 68 to all of the door modules $12_1$-$12_n$ and the liftgate/trunk lid/hatch module 14. Upon receipt of the instruction, the controllers 16 of the modules $12_1$-$12_n$ and 14 direct the associated electronic locks 18 to unlock. Upon confirmation of the unlocked status of the locks 18 by the associated lock sensors 20, the controllers 16 send an appropriate signal through the signal lines 86 to the controller 25 of the lock status module 24 again resulting in the illumination of the first indicator 28 to provide a visual indication of the unlocked status of the vehicle.

Similarly, if the vehicle operator depresses the liftgate/trunk lid/hatch unlock actuator 80, the security code and appropriate control signal are transmitted by the key fob transceiver 84 wirelessly to the RF transceiver module 72 of the motor vehicle. The security code and control signal are then sent through the signal line 70 to the BCM 50 which first confirms the proper security code and then sends an appropriate control signal through the signal line 68 to the liftgate/trunk lid/hatch module 14. Upon receipt of that signal, the controller 16 of the liftgate/trunk lid/hatch module 14 directs the associated electronic lock 18 to unlock. The lock sensor 20 confirms the new status of the electronic lock 18 and sends an unlock signal back to the controller 16. Upon receiving that signal, the controller 16 sends an appropriate control signal along the signal line 86 to the controller 25 of the lock status module 24 which, upon receipt, illuminates the first indicator 28 indicating the unlock status of the vehicle.

The doorlock status display system 10 operates similarly when it receives lock or unlock instructions from other actuators in the motor vehicle including, for example, the door handles (with capacitive locking/unlocking feature) used to open and close the doors, the liftgate handle used to open and close the liftgate, the interior liftgate, trunk lid or hatch release, the interior locking system actuator for locking and unlocking the closures and other like devices. Further, the doors may be locked and unlocked utilizing voice command through the speech processor 64 of the BCM 50 if desired. Any status change in the locked or unlocked state of the closures being monitored is substantially immediately indicated by illumination of the appropriate indicator 28, 30, 32 of the lock status display 26. Further, the lock status module 24 may also include a capacitive contact sensor so that one may touch the module 24 including the display 26 in order to obtain a visual indication of the lock status of the motor vehicle at any desired time. This is a particularly convenient feature when the module 24/display 26 is provided on the vehicle door or an appliqué near the door.

As should be appreciated, the controller 25 of the lock status module 24, the controllers 16 of the closure modules $12_1$-$12_n$ and 14 and the BCM 50 are all in regular communication at all times so as to maintain, retain and confirm the lock status of the vehicle thereby allowing its substantially immediate indication whenever requested or changed by the operator through the various control systems of the motor vehicle. In one possible embodiment, the BCM 50 is configured to provide a signal to each of the controllers 16 of the closure modules $12_1$-$12_n$, 14 several times per second advising of the overall doorlock status of the vehicle. Thus, whenever a user requests information on door status by depressing a switch or taking any action that changes doorlock status, the new status is accurately displayed for several seconds on the lock status display 26 with a delay of only a few milliseconds.

The foregoing has been presented for purposes of illustration and description. It is not intended to be exhaustive or to limit the embodiments to the precise form disclosed. Obvious modifications and variations are possible in light of the above teachings. For example, the display device 62 of the BCM 50 could also display the lock status of the motor vehicle if desired. Further, while the previous description required the operator to depress the door unlock activator 78 twice in order to unlock all the doors of the motor vehicle, it should be appreciated that the system may be configured to unlock all of the doors in response to a single depression of the activator 78 if desired. Still further, it should be appreciated that one unit may be utilized to display all three icons at a single location, the icon being displayed at any given time indicating the door lock status of the vehicle. All such modifications and variations are within the scope of the appended claims when interpreted in accordance with the breadth to which they are fairly, legally and equitably entitled.

What is claimed:
1. A door lock status display system for a motor vehicle, comprising:
    a door module including a controller, a door lock and a door status sensor for each door of the motor vehicle; and
    a lock status display module including a lock status controller, a first indicator for door unlocked status, a second indicator for all doors locked status and a third indicator for all doors locked and closed status.

2. The system of claim 1, wherein said door status sensor includes a door lock sensor and a door position sensor.

3. The system of claim 2, wherein said first indicator includes a first light source, said second indicator includes a second light source and said third indicator includes a third light source.

4. The system of claim 3, wherein said first indicator illuminates in a first color, said second indicator illuminates in a second color and said third indicator illuminates in a third color.

5. The system of claim 4, wherein said first color is green, said second color is orange and said third color is red.

6. The system of claim 2, wherein said first indicator includes a first illuminated icon, said second indicator includes a second illuminated icon and said third indicator incudes a third illuminated icon.

7. The system of claim 6, wherein said first, second and third icons are illuminated in a different color.

8. A system of claim 6, wherein said first, second, and third icons are displayed by one unit and appear in the same location.

9. The system of claim 7, wherein said first icon is illuminated in green, said second icon is illuminated in orange and said third icon is illuminated in red.

10. The system of claim 8, wherein said first icon depicts an unlocked padlock and said second and third icons depict a locked padlock.

11. The system of claim 1, wherein said lock status display module is located on a door of the vehicle.

12. The system of claim 1, wherein said lock status display module is located on a body panel of the vehicle.

13. The system of claim 1, wherein said lock status display module is located on an applique of the vehicle.

14. The system of claim 1, wherein said lock status display module is located on a door handle of the vehicle.

15. The system of claim 1, further including additional door modules for each door of said motor vehicle wherein each such additional door module includes a controller, a door lock and a door status sensor.

16. The system of claim 14, further including a liftgate/trunk lid/hatch module for a liftgate/trunk lid/hatch of the motor vehicle, said liftgate/trunk lid/hatch module including a controller, a liftgate/trunk lid/hatch lock and a liftgate/trunk lid/hatch status sensor.

17. The system of claim 15, wherein said liftgate/trunk lid/hatch status sensor includes a liftgate/trunk lid/hatch lock sensor and a liftgate/trunk lid/hatch position sensor.

18. A method of displaying the lock status of a motor vehicle, comprising:
   determining, by sensor, closure status of each closure of the motor vehicle;
   providing, by computing device, a first indication when at least one of said closures is unlocked;
   providing, by a computing device, a second indication when all of said closures are locked but at least one of said closures is not properly closed; and
   providing, by computing device, a third indication when all of said closures are locked and closed.

* * * * *

UNITED STATES PATENT AND TRADEMARK OFFICE
CERTIFICATE OF CORRECTION

Page 1 of 1

PATENT NO.     : 9,487,140 B2
APPLICATION NO. : 14/608234
DATED          : November 8, 2016
INVENTOR(S)    : Howard Paul Linden et al.

It is certified that error appears in the above-identified patent and that said Letters Patent is hereby corrected as shown below:

In the Claims

Column 7, Line 16, please replace "incudes" with ---includes---

Signed and Sealed this
Twenty-eighth Day of February, 2017

Michelle K. Lee
*Director of the United States Patent and Trademark Office*